(No Model.) 2 Sheets—Sheet 1.
J. S. MOSS.
UNDERGROUND ELECTRIC CONDUIT AND TROLLEY BAR FOR ELECTRIC RAILWAYS.

No. 485,555. Patented Nov. 1, 1892.

Witnesses.
Robert Pratt.
J. A. Rutherford.

Inventor
John S. Moss.
By James L. Norris.
Atty.

THE NORRIS PETERS CO., PHOTO-LITHO., WASHINGTON, D. C.

(No Model.) 2 Sheets—Sheet 2.
J. S. MOSS.
UNDERGROUND ELECTRIC CONDUIT AND TROLLEY BAR FOR ELECTRIC RAILWAYS.
No. 485,555. Patented Nov. 1, 1892.
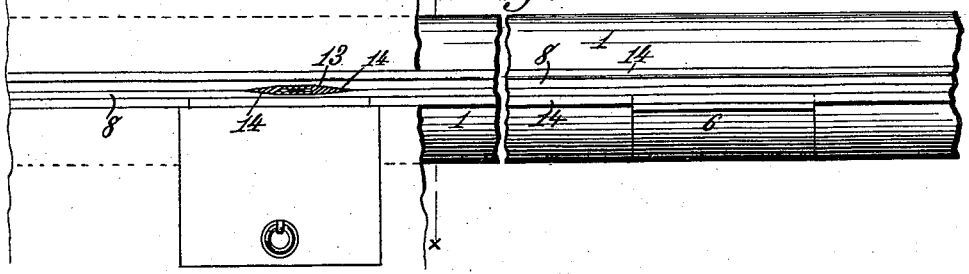
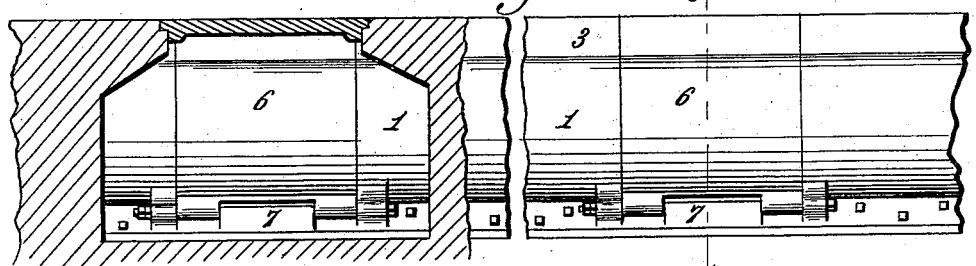
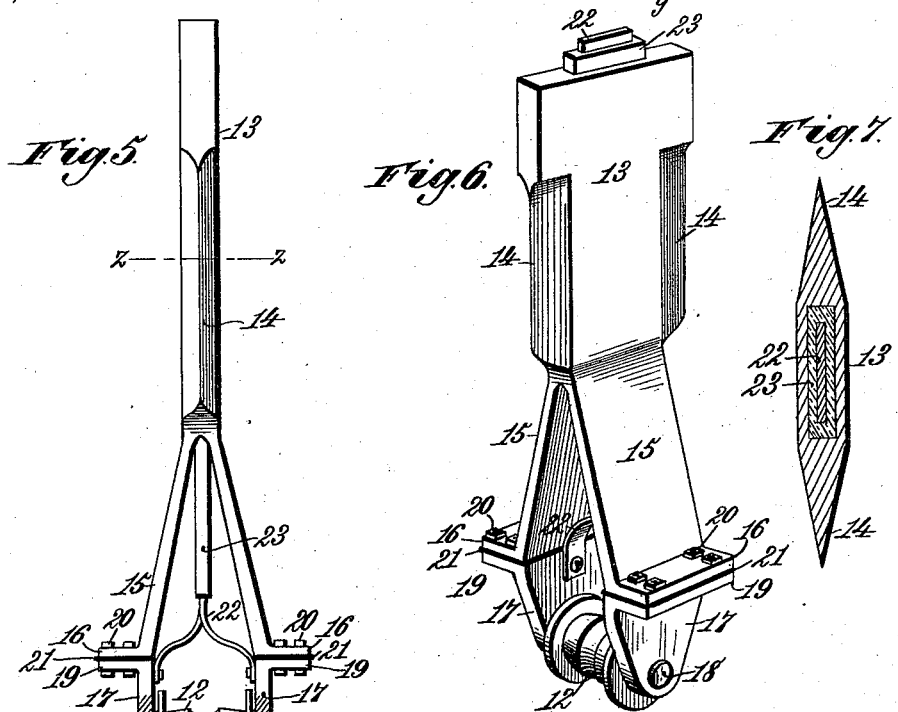
Witnesses:
Robert Everett
J. A. Rutherford
Inventor:
John S. Moss.
By James L. Norris
Atty.

UNITED STATES PATENT OFFICE.

JOHN S. MOSS, OF MARTINSBURG, WEST VIRGINIA.

UNDERGROUND ELECTRIC CONDUIT AND TROLLEY-BAR FOR ELECTRIC RAILWAYS.

SPECIFICATION forming part of Letters Patent No. 485,555, dated November 1, 1892.

Application filed April 16, 1892. Serial No. 429,452. (No model.)

*To all whom it may concern:*

Be it known that I, JOHN S. MOSS, a citizen of the United States, residing at Martinsburg, in the county of Berkeley and State of West Virginia, have invented new and useful Improvements in Underground Electric Conduits and Trolley-Bars for Railway-Cars, of which the following is a specification.

This invention relates to electric-railway systems wherein an electric conductor is arranged underground for transmitting an electric current through a trolley to operate a motor on a railway-car.

The object of my invention is to provide a new and improved underground conduit for the electric conductor, whereby the trolley bar or rod is constantly insulated from the edges of the slot and the latter is effectually closed to exclude snow, water, dirt, and the like.

The invention also has for its object to provide a novel conduit constructed to receive and support the electric conductor and susceptible of being swung open on hinges for convenient access to the interior should occasion demand.

The invention also has for its object to provide a novel trolley bar or rod especially designed for use in connection with the improved conduit.

To accomplish all these objects, my invention involves the features of construction and the combination or arrangement of devices hereinafter described and claimed, reference being made to the accompanying drawings, in which—

Figure 1:
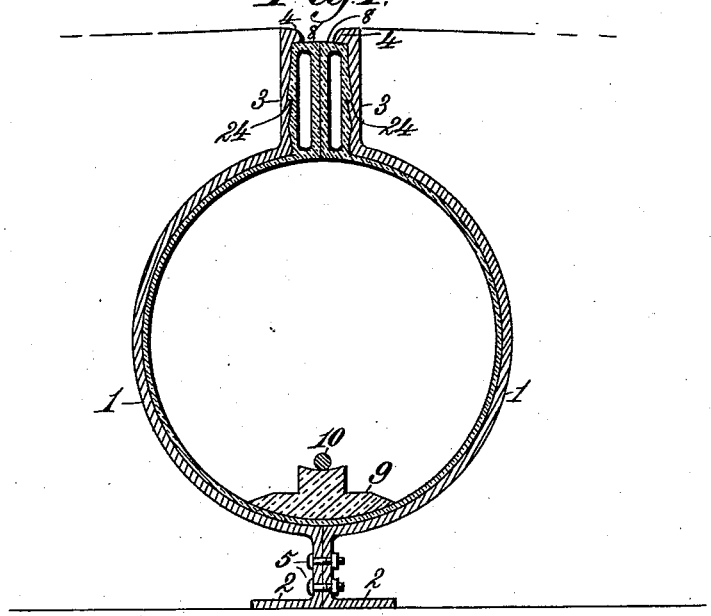
Figure 2:
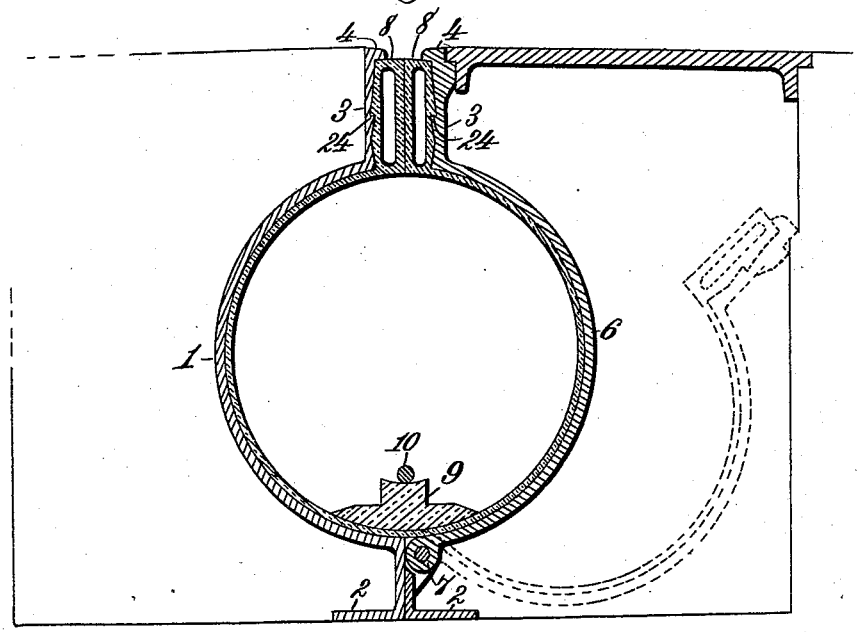

Figure 1 is a vertical sectional view taken on the line $x\ x$, Fig. 3. Fig. 2 is a similar view taken on the line $y\ y$, Fig. 4. Fig. 3 is a top plan view showing a portion of a conduit constructed in accordance with my invention. Fig. 4 is a sectional side elevation of the same. Fig. 5 is an elevation of the trolley bar or rod arranged in operative position relative to the electric conductor. Fig. 6 is a detail perspective view of the trolley bar or rod; and Fig. 7 is a detail sectional view taken on the line $z\ z$, Fig. 5.

In order to enable those skilled in the art to make and use my invention, I will now describe the same in detail, referring to the drawings, wherein—

The numeral 1 indicates a cylindrical metallic casing arranged underground and divided vertically into two longitudinal sections and formed with a supporting-base or foot-piece 2, which rests against the bottom portion of the tunnel or excavation in which the conduit is arranged. The top portion of each section is formed with a vertical wall 3, having at its upper edge an overhanging lip 4. The foot-piece or supporting-base 2 is made in two parts, formed, respectively, with the sections of the cylindrical casing, and these parts are detachably connected through the medium of bolts 5, as in Fig. 1. The casing comprises hinged sections 6, disposed at proper intervals along its length and hinged or pivoted at their lower edges to the foot-piece or supporting-base, as at 7, Figs. 2 and 4.

The interior of the cylindrical casing is provided with a lining composed of rubber or its compounds and constructed of tubular form to accurately fit and lie against the internal surface of the casing. The tubular lining is formed integral with a pair of compressible hollow cushions 8, which are rectangular in cross-section and bear against the vertical walls 3 of the casing, while the overhanging lips 4 of such walls rest against the upper edges of the cushions. The two cushions normally rest in contact with each other, as in Fig. 2, but are laterally compressible to permit the passage of a trolley bar or rod, hereinafter explained, in such manner that the trolley bar or rod operates to separate or compress the end cushions, while the latter will spring together and effectually close the slot in the casing to exclude snow, water, dirt, and other matter.

The lower portion of the conduit constructed as above described contains a longitudinal support 9, composed, preferably, of vulcanized india-rubber, for the purpose of supporting the electric conductor 10, in contact with which the trolley 12 travels in the usual manner for the purpose of transmitting an electric current through the trolley to a motor on a railway-car. The trolley-bar comprises a hollow shank 13, the edges of which converge at opposite sides to form tapering portions 14, which materially facilitate the separation or compression of the elastic hollow cushions as the trolley bar or rod traverses the slot in the conduit.

The shank 13 is provided with a bifurcated lower extremity, the arms 15 of which diverge and are formed with lateral flanges 16. The lower portion of the trolley bar or rod comprises a separate section composed, as here shown, of cheek-pieces 17, supporting an axle or shaft 18 and having at their upper ends the lateral flanges 19. The flanges 16 and 19 are connected by bolts or screws 20, and between the flanges are interposed blocks or sheets 21, of vulcanized rubber or other insulating material, for the purpose of insulating the lower section of the trolley bar or rod from the upper section or shank thereof. The electric wires 22 are insulated by a suitable covering 23, which extends through the hollow portion of the shank 13 and connects in any suitable manner with a motor on the car. Inasmuch as the motor and car do not constitute any part of my present invention, I do not deem it necessary to illustrate the same in the drawings. The lower ends of the electric wires 22 connect, respectively, with the cheek-pieces 17, and since the latter are of metal electrically connected with the axle or shaft 18 it will be obvious that the electric current from the conductor 10 will flow through the trolley, shaft, or axle and cheek-pieces to the electric wires.

By constructing the trolley-bar with tapered edges 14 the oppositely-arranged hollow cushions 8 are gradually opened and closed as the trolley bar or rod traverses the slot in the conduit, so that danger of injuring the hollow cushions is avoided. By forming the rubber tubular lining integral with the hollow elastic cushions I materially reduce the liability of leakage, in that there are no joints at the points where the cushions join the rubber lining. By providing the cylindrical conduit with laterally-swinging hinged sections at proper intervals it is possible to conveniently gain access to the interior of the conduit when occasion demands. The inner surfaces of the vertical walls 3 are formed with offsets 24 to interlock with the walls of the hollow cushions for the purpose of securely retaining the cushions in engagement with the walls.

Having thus described my invention, what I claim is—

1. The combination, with a casing having a longitudinal opening or slot, of an elastic lining formed integral with a pair of compressible cushions which normally rest in contact with each other, a conductor-support in the casing, a conductor arranged on the support, and a trolley-bar which operates to separate the cushions, substantially as described.

2. The combination, with a single casing having a longitudinal opening or slot, of a rubber formed integral with a pair of hollow compressible cushions which normally rest in contact with each other, an insulating-support in the casing, and an electric conductor arranged on the support, substantially as described.

3. The combination, with a casing having a longitudinal opening or slot and comprising hinged sections susceptible of being opened and closed, of an elastic lining formed integral with a pair of compressible cushions which normally rest in contact with each other, a conductor-support in the casing, and a conductor arranged on the support, substantially as described.

4. The combination, with an underground conduit containing an electric conductor, of a trolley bar or rod composed of upper and lower sections, the upper section consisting of a hollow shank having a bifurcated lower extremity, the arms of which have lateral flanges and the lower section consisting of cheek-pieces carrying an axle or shaft and having lateral flanges at their upper ends to connect with the lateral flanges of the upper section, an insulating material interposed between the lateral flanges of said upper and lower sections, and a trolley mounted on the axle or shaft between the cheek-pieces of the lower section, substantially as described.

5. The combination, with a casing having a longitudinal opening and an elastic lining having compressible cushions which normally rest in contact with each other, of a trolley bar or rod formed with tapering opposite edges to facilitate separating the cushions as the trolley bar or rod moves between the same, substantially as described.

In testimony whereof I have hereunto set my hand and affixed my seal in presence of two subscribing witnesses.

JOHN S. MOSS. [L. S.]

Witnesses:
 ALBERT H. NORRIS,
 J. A. RUTHERFORD.